United States Patent
Kawakubo et al.

(10) Patent No.: US 9,708,962 B2
(45) Date of Patent: Jul. 18, 2017

(54) SECONDARY-AIR SUPPLY STRUCTURE FOR SADDLE-RIDE TYPE VEHICLE

(71) Applicant: HONDA MOTOR CO., LTD., Tokyo (JP)

(72) Inventors: Shinsuke Kawakubo, Wako (JP); Jun Nakano, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/066,890

(22) Filed: Mar. 10, 2016

(65) Prior Publication Data

US 2016/0281577 A1 Sep. 29, 2016

(30) Foreign Application Priority Data

Mar. 27, 2015 (JP) ................. 2015-066892

(51) Int. Cl.
| | | |
|---|---|---|
| *F01N 3/00* | (2006.01) | |
| *F01N 3/02* | (2006.01) | |
| *F01N 3/10* | (2006.01) | |
| *F01N 3/20* | (2006.01) | |
| *F01N 13/08* | (2010.01) | |
| *F01N 3/05* | (2006.01) | |
| *F02F 7/00* | (2006.01) | |
| *F02F 1/06* | (2006.01) | |

(52) U.S. Cl.
CPC ............ *F01N 13/082* (2013.01); *F01N 3/05* (2013.01); *F01N 2590/04* (2013.01); *F02F 1/06* (2013.01); *F02F 7/0004* (2013.01)

(58) Field of Classification Search
CPC ... F01N 3/082; F01N 3/05; F01N 3/10; F01N 13/102; F01N 13/1802; F01N 13/1872; F01N 2590/04
USPC .................................. 60/289, 290, 323, 324
See application file for complete search history.

(56) References Cited

U.S. PATENT DOCUMENTS

| | | | | |
|---|---|---|---|---|
| 5,381,658 A * | 1/1995 | Meguro | ................. | F01N 9/007 60/276 |
| 5,657,628 A * | 8/1997 | Takeuchi | ................. | F01N 3/34 180/219 |
| 7,895,824 B2 * | 3/2011 | Tsujimura | ................ | F01N 3/22 60/277 |

FOREIGN PATENT DOCUMENTS

JP       2009-228672 A     10/2009

* cited by examiner

*Primary Examiner* — Nicholas J Weiss
*Assistant Examiner* — Dapinder Singh
(74) *Attorney, Agent, or Firm* — Chip Law Group

(57) ABSTRACT

A secondary-air supply structure for a saddle-ride type vehicle includes a cylinder block and a cylinder head which extend upward from a crankcase, and right and left secondary-air supply pipes which are connected to the right and left of an exhaust outlet portion of the cylinder head and through which secondary air is supplied to an exhaust port. The right and left secondary-air supply pipes extend from the front surface of the cylinder head to the right and left of the cylinder head, respectively, and include bent-back pipe sections extending along the right and left surfaces of the cylinder head and bent back toward the front side.

12 Claims, 11 Drawing Sheets

SECONDARY-AIR SUPPLY STRUCTURE FOR SADDLE-RIDE TYPE VEHICLE

CROSS REFERENCE TO RELATED APPLICATIONS

This application claims the benefit of Japanese Priority Patent Application JP 2015-066892 filed on Mar. 27, 2015, the entire contents of which are incorporated herein by reference.

TECHNICAL FIELD

The present application relates to a secondary-air supply structure for a saddle-ride type vehicle, the secondary-air supply structure including, in the front surface of a cylinder head, an exhaust outlet portion to which an exhaust pipe is connected.

BACKGROUND ART

There have been saddle-ride type vehicles such as motorcycles which include a plurality of secondary-air supply pipes connected to an exhaust pipe of a single-piston engine and a reed valve provided to each of the secondary-air supply pipes, the reed valves being disposed away from each other in the vehicle width direction (see Patent Document 1, for example).

PRIOR ART DOCUMENT

Patent Document

[Patent Document 1] Japanese Patent Application Publication No. 2009-228672

SUMMARY OF THE APPLICATION

Meanwhile, for further improvement in exhaust gas purification efficiency and the like, the structure may be designed to supply secondary air to an exhaust port, which is hotter. In this case, however, the secondary-air supply pipes are likely to be hot and therefore require a measure against heat. The secondary-air supply pipes may also be made longer and cooled with traveling air. In this case, however, the size is likely to be increased and it is also difficult to provide a space for the piping.

The present application has been made in view of the above circumstances, and an object thereof is to provide a secondary-air supply structure for a saddle-ride type vehicle which enables efficient cooling of secondary-air supply pipes and compact arrangement of the secondary-air supply pipes.

For the purpose of solving the above-mentioned problems, the present application provides a secondary-air supply structure for a saddle-ride type vehicle, the secondary-air supply structure including a cylinder block (24) and a cylinder head (25) which extend upward from a crankcase (22), an exhaust port (25H) which is provided inside the cylinder head (25) and communicates with a combustion chamber (25R), and an exhaust outlet portion (25S) which is provided in a front surface of the cylinder head (25) and communicates with the exhaust port (25H) and to which an exhaust pipe (44) is connected, the secondary-air supply structure including right and left secondary-air supply pipes (51R, 51L) which are connected to right and left of the exhaust outlet portion (25S) of the cylinder head (25) and through which secondary air is supplied to the exhaust port (25H), in which the right and left secondary-air supply pipes (51R, 51L) extend from the front surface of the cylinder head (25) to right and left of the cylinder head (25), respectively, and include bent-back pipe sections (51R2, 51L2) extending along right and left surfaces of the cylinder head (25) and bent back toward a front side.

The above structure may be such that the cylinder head (25) includes cooling fins (23F) at least on the right and left surfaces thereof, and axes (LB) of connecting paths connecting the right and left secondary-air supply pipes (51R, 51L) and the exhaust port (25H) to each other are inclined to the exhaust port (25H) and cross each other inside the exhaust port (25H) in a view in a direction of a cylinder axis.

Also, the above structure may be such that the structure further includes: a fuel tank (47) disposed above the cylinder head (25); a secondary-air control device (64) disposed forward of the cylinder head (25) and under the fuel tank (47) and provided upstream of the bent-back pipe sections (51R2, 51L2); and a sub air cleaner (62) provided upstream of the secondary-air control device (64), and the sub air cleaner (62) is disposed under the fuel tank (47) and offset from the exhaust pipe (44) to any one of a right side and a left side in a plan view.

Also, the above structure may be such that the sub air cleaner (62) is disposed at a position between the secondary-air control device (64) and the cylinder head (25) in a side view such that an upper side of the sub air cleaner (62) is covered by the fuel tank (47).

Also, the above structure may be such that the structure further includes: a heat shield member (50) provided under the fuel tank (47); and a resonator (63) provided between the sub air cleaner (62) and the secondary-air control device (64), and the resonator (63) is supported on the heat shield member (50).

Also, the above structure may be such that the secondary-air supply pipes (51R, 51L) on the cylinder head (25) side are formed of metallic pipes while secondary-air supply pipes (75) on the secondary-air control device (64) side are formed of flexible pipes having flexibility, and connecting portions (85) of the metallic pipes (51R, 51L) and the flexible pipes (75) at which the metallic pipes (51R, 51L) and the flexible pipes (75) are connected to each other are adjacent to each other and offset from the exhaust pipe (44) to any one of the right side and the left side in the plan view.

Also, the above structure may be such that the sub air cleaner (62) includes a cover (62B), the upstream secondary-air supply pipes (71) are connected to the sub air cleaner (62) from a rear side, and a front side of the cover (62B) is a closed surface.

According to the present application, the secondary-air supply structure includes the left and right secondary-air supply pipes through which secondary air is supplied to the exhaust port, and the right and left secondary-air supply pipes extend from the front surface of the cylinder head to the right and left of the cylinder head, respectively, and include the bent-back pipe sections extending along the right and left surfaces of the cylinder head and bent back toward the front side. In this way, it is possible to efficiently cool the secondary-air supply pipes with cooling air flowing along the sides of the cylinder head and also to compactly dispose the secondary-air supply pipes along the right and left surfaces of the cylinder head.

Also, the connecting paths connecting the right and left secondary-air supply pipes and the exhaust port to each other may be inclined to the exhaust port and cross each other inside the exhaust port. In this way, it is possible to avoid decrease in the area of the cooling fins on the right and left sides of the cylinder head and also to supply the secondary air to a further upstream side in the exhaust port. Hence, the exhaust-gas purification performance is easily enhanced, in combination with the cooling effect achieved by the structure in which the connecting portions of the secondary-air supply pipes face the front surface of the cylinder head.

Also, the sub air cleaner provided upstream of the secondary-air control device may be disposed above the cylinder head and under the fuel tank and offset from the exhaust pipe to any one of the right side and the left side in the plan view. In this way, it is possible to dispose the sub air cleaner by utilizing the space under the fuel tank and also to suppress the increase in the temperature of the sub air cleaner and the like due to radiated heat. Thus, the exhaust-gas purification performance is easily enhanced.

Also, the sub air cleaner may be disposed at a position between the secondary-air control device and the cylinder head in the side view such that the sub air cleaner is covered by the fuel tank. In this way, it is possible to dispose the sub air cleaner by utilizing the space under the fuel tank and also to reduce contamination and damage of the sub air cleaner.

Also, the resonator provided between the sub air cleaner and the secondary-air control device may be supported on the heat shield member provided under the fuel tank. In this way, it is possible to dispose the resonator by effectively utilizing the space between the sub air cleaner and the secondary-air control device and also to lower operating noise generated during the supplying of the secondary air. In addition, no exclusive component is needed to mount the resonator and the number of components can therefore be reduced.

Also, the connecting portions of the metallic secondary-air supply pipes and the flexible secondary-air supply pipes may be adjacent to each other and offset from the exhaust pipe to any one of the right side and the left side. In this way, a measure against heat can be provided to the cylinder head side while the secondary-air control device side can be easily routed. In addition, these pipes can be compactly disposed.

Also, the sub air cleaner may include the cover, the upstream secondary-air supply pipes may be connected to the sub air cleaner from the rear side, and the front side of the cover may be a closed surface. In this way, it is possible to obtain an improved measure against dust.

DETAILED DESCRIPTION

Figure 1:
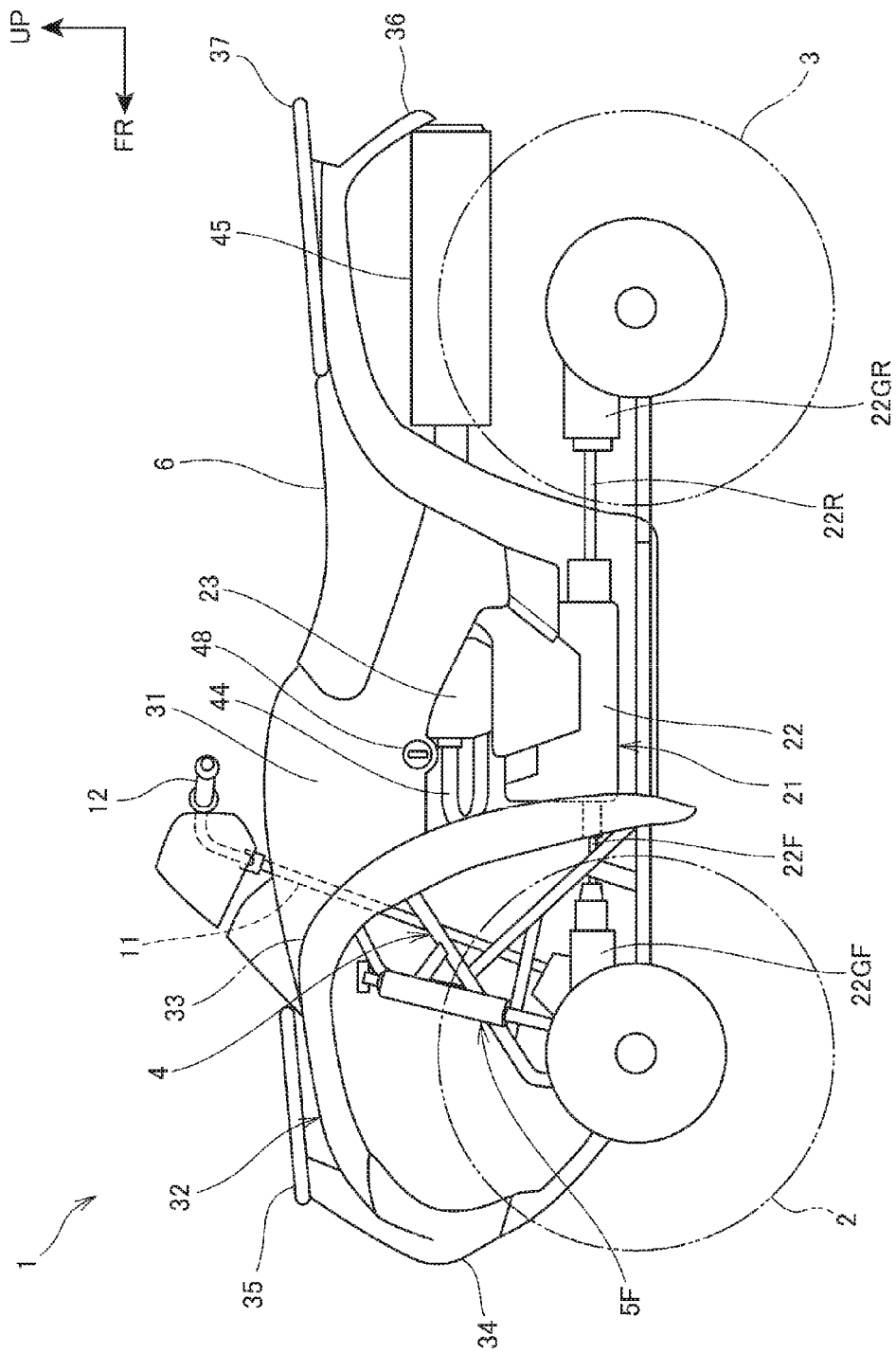
FIG. 1 is a right-side view of a saddle-ride type vehicle according to an embodiment of the present application.

Embodiments of the present application will be described below with reference to the drawings. Note that in the description, directional terms such as front, rear, right, left, upper, and lower are identical to those directions in relation to the vehicle body unless otherwise noted. Moreover, reference signs FR, UP, LH shown in the drawings represent the front, upper, and left sides of the vehicle body, respectively.

FIG. 1 is a side view of a saddle-ride type vehicle according to the embodiment of the present application.

This saddle-ride type vehicle 1 is an all terrain vehicle abbreviated as ATV including a pair of right and left front wheels 2 and a pair of right and left rear wheels 3 with low-pressure balloon tires of a relatively large diameter at the front and rear sides of a small and light vehicle body and having a large minimum ride height to achieve enhanced drivability on rough terrains.

A vehicle body frame 4 of this saddle-ride type vehicle 1 is a metallic frame obtained by joining metallic members including a plurality of metallic pipes into a single integral piece by welding or the like, and is formed in a pipe frame structure long in the front-rear direction of the vehicle body.

The right and left front wheels 2 are supported vertically movably on the right and left sides of a front section of the vehicle body frame 4 with front suspensions 5F therebetween. The right and left rear wheels 3 are supported vertically movably on the right and left sides of a rear section of the vehicle body frame 4 with rear suspensions not shown therebetween.

Moreover, a steering shaft 11 is turnably supported on the center of the front section of the vehicle body frame 4. A steering handlebar 12 is integrally mounted to an upper portion of this steering shaft 11. The right and left front wheels 2 are steered to the right or left through the steering shaft 11 in response to operation of the steering handlebar 12.

An engine 21 is supported on the center of the vehicle body frame 4 in the front-rear direction. This engine 21 is a single-piston internal combustion engine and formed as an engine unit including a crankcase 22 constituting a lower section and a cylinder section 23 standing thereon substantially vertically. A front-wheel propeller shaft 22F and a rear-wheel propeller shaft 22R which are coupled to a transmission inside the crankcase 22 are led out forward and rearward from the front and rear sides of the crankcase 22, respectively. The propeller shafts 22F, 22R are coupled to front and rear final gear cases 22GF, 22GR provided on the lower sides of the front and rear sections of the vehicle body frame 4, respectively.

In this way, the power of the engine 21 is transmitted to the front wheels 2 and the rear wheels 3 through the propeller shafts 22F, 22R and the final gear cases 22GF, 22GR.

A rider seat 6 and exterior components are mounted on the vehicle body frame 4, the rider seat 6 being disposed at the center of the vehicle body in the front-rear direction. The exterior components include: a tank cover 31 disposed forward of the rider seat 6; a resin vehicle body cover 32 covering a front section of the vehicle body from its upper side; resin front fenders 33 covering the upper to rear sides of the front wheels 2; a front protector 34 disposed on the front side of the vehicle body; a front carrier 35 disposed on a front upper portion of the vehicle body; resin rear fenders 36 covering the upper sides of the rear wheels 3; a rear carrier 37 disposed on a rear upper portion of the vehicle body; and the like.

Figure 2:
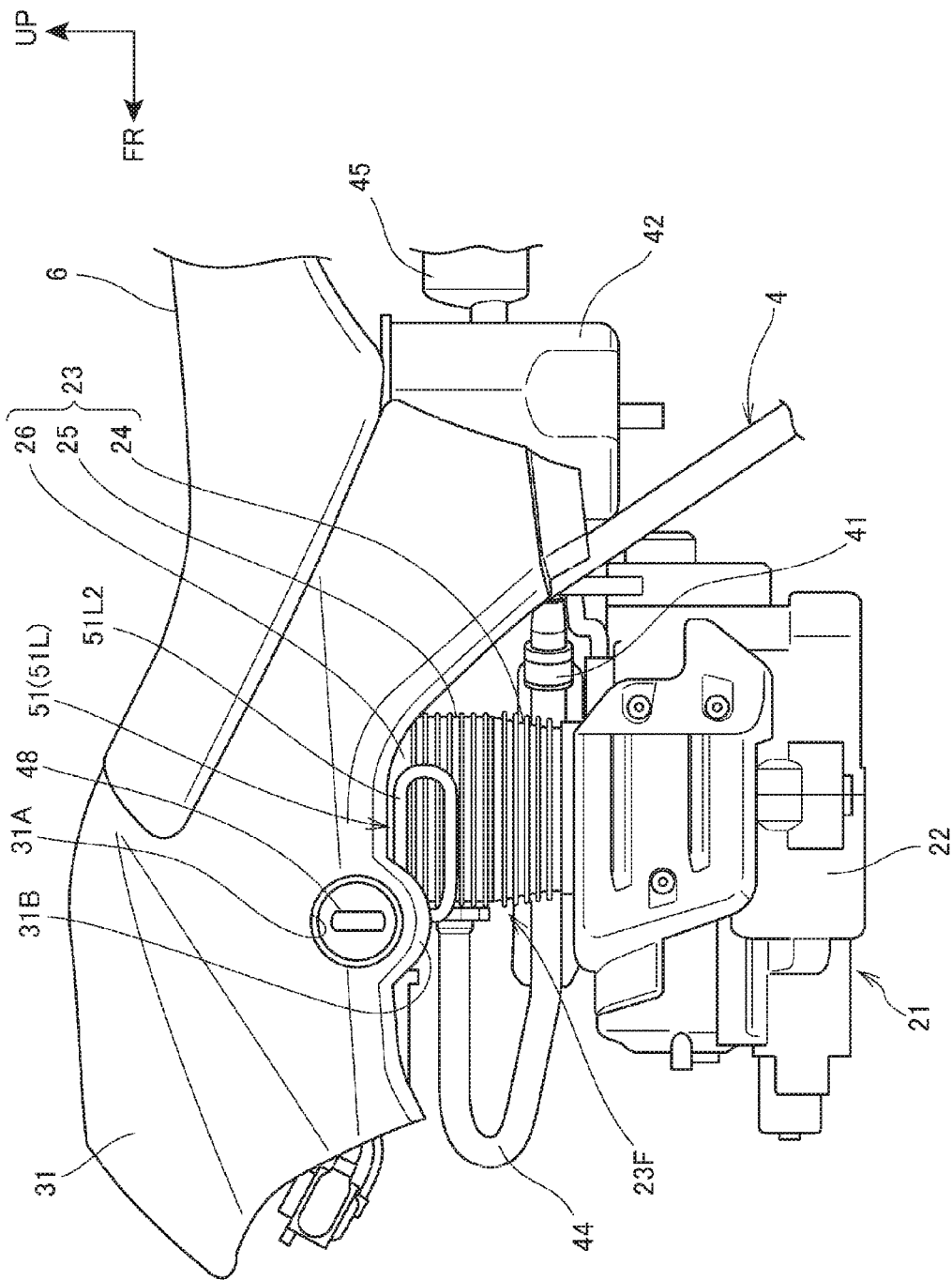
FIG. 2 is a view of an engine seen from the left side together with its surroundings.
Figure 3:
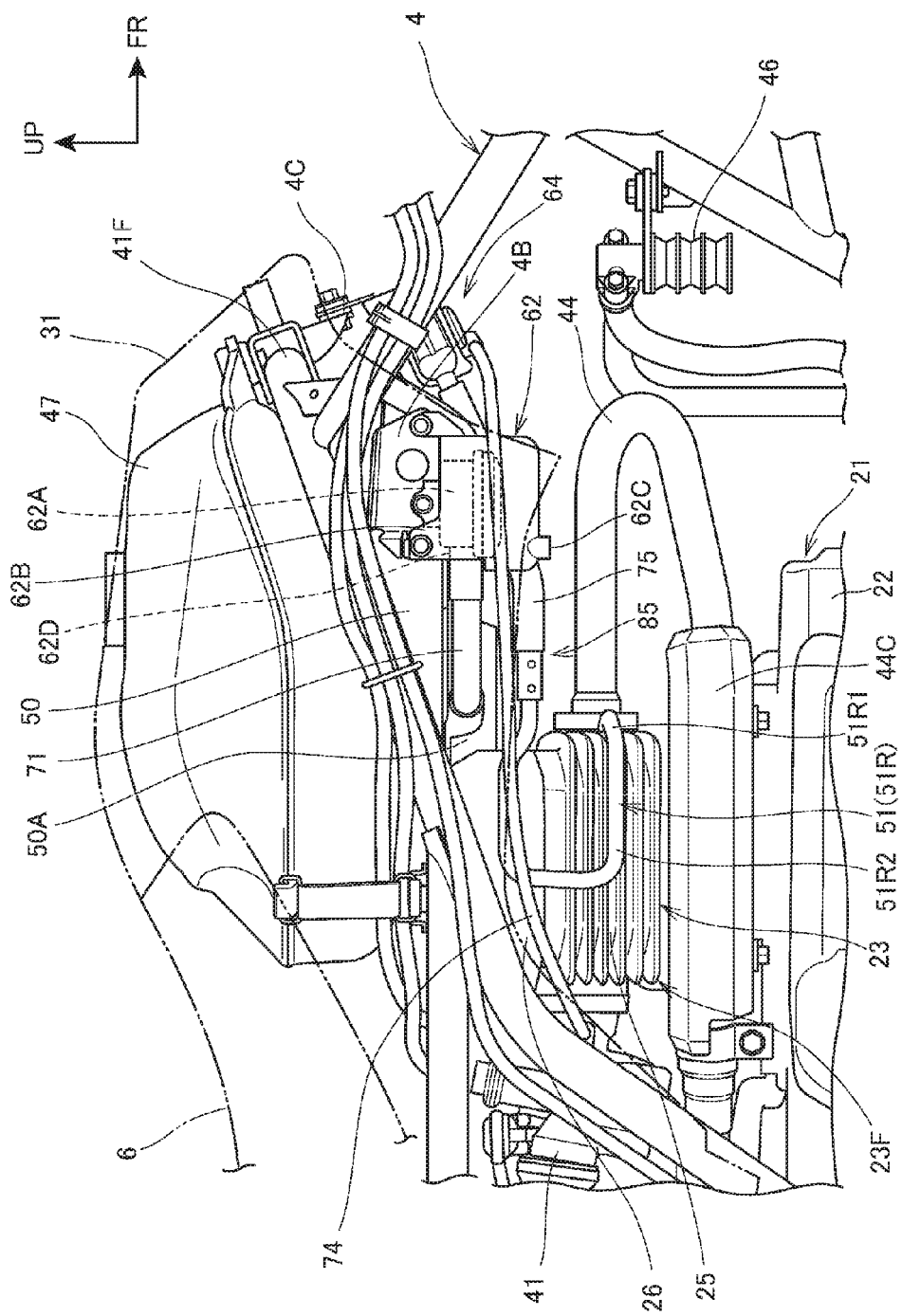
FIG. 3 is a view of the engine seen from the right side together with its surroundings.

FIG. 2 is a view of the engine 21 seen from the left side together with its surroundings. FIG. 3 is a view of the engine 21 seen from the right side together with its surroundings.

As shown in FIG. 2, an air cleaner 42 is connected to the rear side of the cylinder section 23 of the engine 21 through a fuel supply device 41. The fuel supply device 41 and the air cleaner 42 constitute the intake system of the engine 21.

A single exhaust pipe 44 is connected to the front surface of the cylinder section 23 of the engine 21. This exhaust pipe 44 extends forward from the cylinder section 23, is bent rearward, extends rearward passing the right side of the cylinder section 23, and is then connected to a single exhaust muffler 45, which is supported on the rear section of the vehicle body. The exhaust pipe 44 and the exhaust muffler 45 constitute the exhaust system of the engine 21.

The cylinder section 23 includes a cylinder block 24 coupled to the upper side of a front section of the crankcase 22, a cylinder head 25 coupled to an upper section of this cylinder block 24, and a head cover 26 coupled to an upper section of this cylinder head 25. The exhaust pipe 44 is connected to the front surface of the cylinder head 25.

Cooling fins 23F are provided on the peripheries of the cylinder block 24 and the cylinder head 25 and can efficiently cool the cylinder block 24 and the cylinder head 25 with traveling air from the front side.

Also, as shown in FIG. 3, an oil cooler 46 is provided forward of the engine 21, the oil cooler 46 being supported on the vehicle body frame 4. The oil cooler 46 can cool oil that lubricates the inside of the engine 21 by utilizing the traveling air from the front side of the vehicle body. Also, an exhaust pipe cover 44C is mounted on the exhaust pipe 44, the exhaust pipe cover 44C covering the exhaust pipe 44 by a side (right side) of the cylinder section 23.

As shown again in FIG. 3, a fuel tank 47 configured to store fuel to be supplied to the engine 21 is provided above the engine 21, and the tank cover 31 covers the upper, right, and left sides of the fuel tank 47.

As shown in FIG. 2, a fuel cock 48 is provided through a left surface portion of the tank cover 31 in such a way as to be exposed therefrom to the outside, the fuel cock 48 being provided in a fuel supply path from the fuel tank 47. The rider can easily open and close the fuel supply path by operating this fuel cock 48.

In this structure, the tank cover 31 is provided with an opening portion 31A through which the fuel cock 48 is exposed, and also provided with a downwardly curved portion 31B functioning as a guard surrounding a lower section of the fuel cock 48 exposed from the opening portion 31A. Being provided with this curved portion 31B, the tank cover 31 partially surrounds the fuel cock 48, thereby making it less likely for the rider's hand to touch the cylinder section 23 of the engine 21 and secondary-air supply pipes 51 to be described later when the rider operates the fuel cock 48.

As shown in FIG. 3, the vehicle body frame 4 includes a pair of front upper frames 4F spaced from each other in the left-right direction, extending upwardly forward above the engine 21, and connected to each other in a forwardly-projecting U-shape forwardly above the engine 21. The fuel tank 47 is placed on this front upper frame 4F. Thus, the fuel tank 47 is disposed from an upper side to a front upper side relative to the fuel tank 47.

Figure 4:
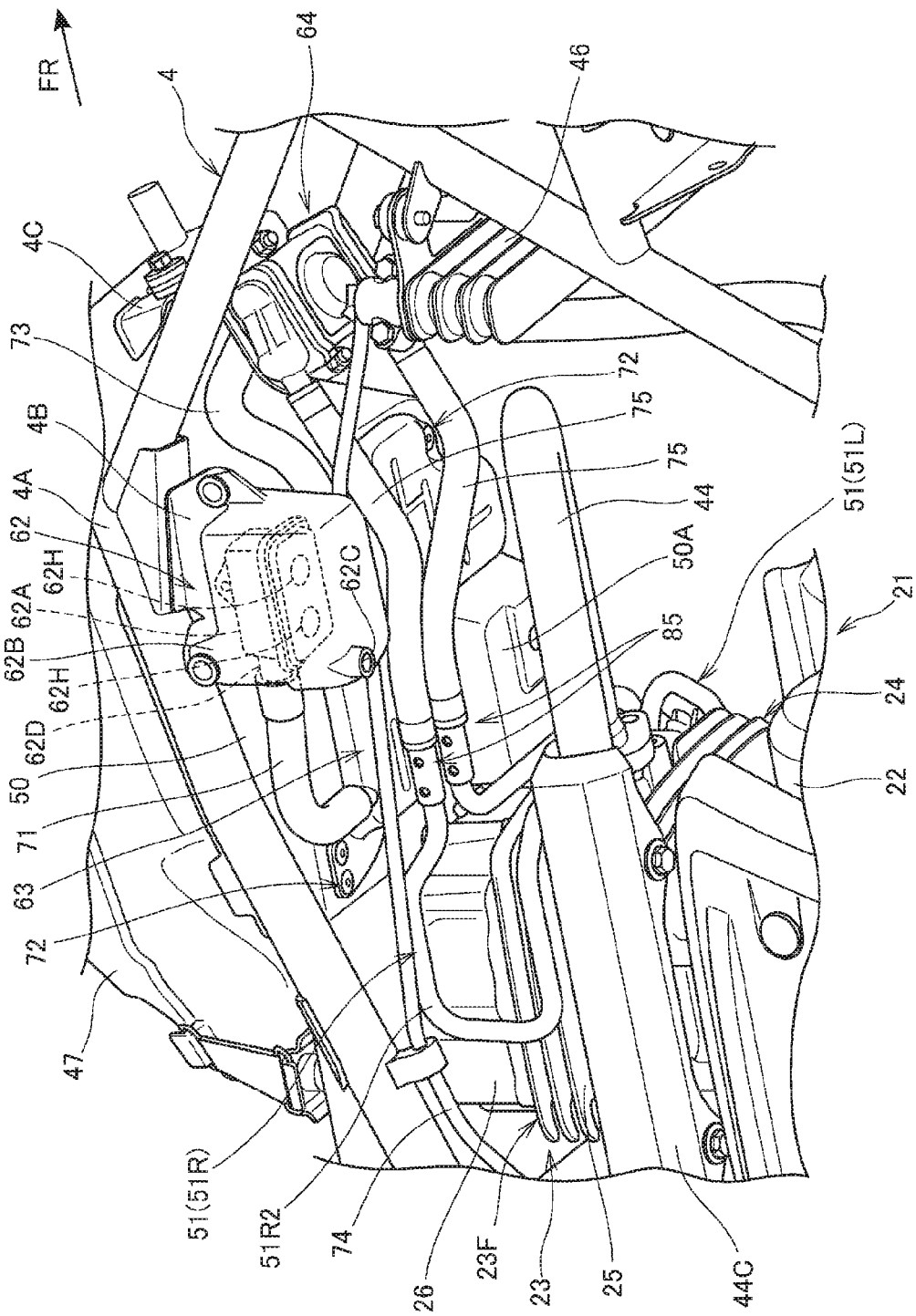
FIG. 4 is a perspective view of a fuel tank seen obliquely from a right lower side together with its surroundings.
Figure 5:
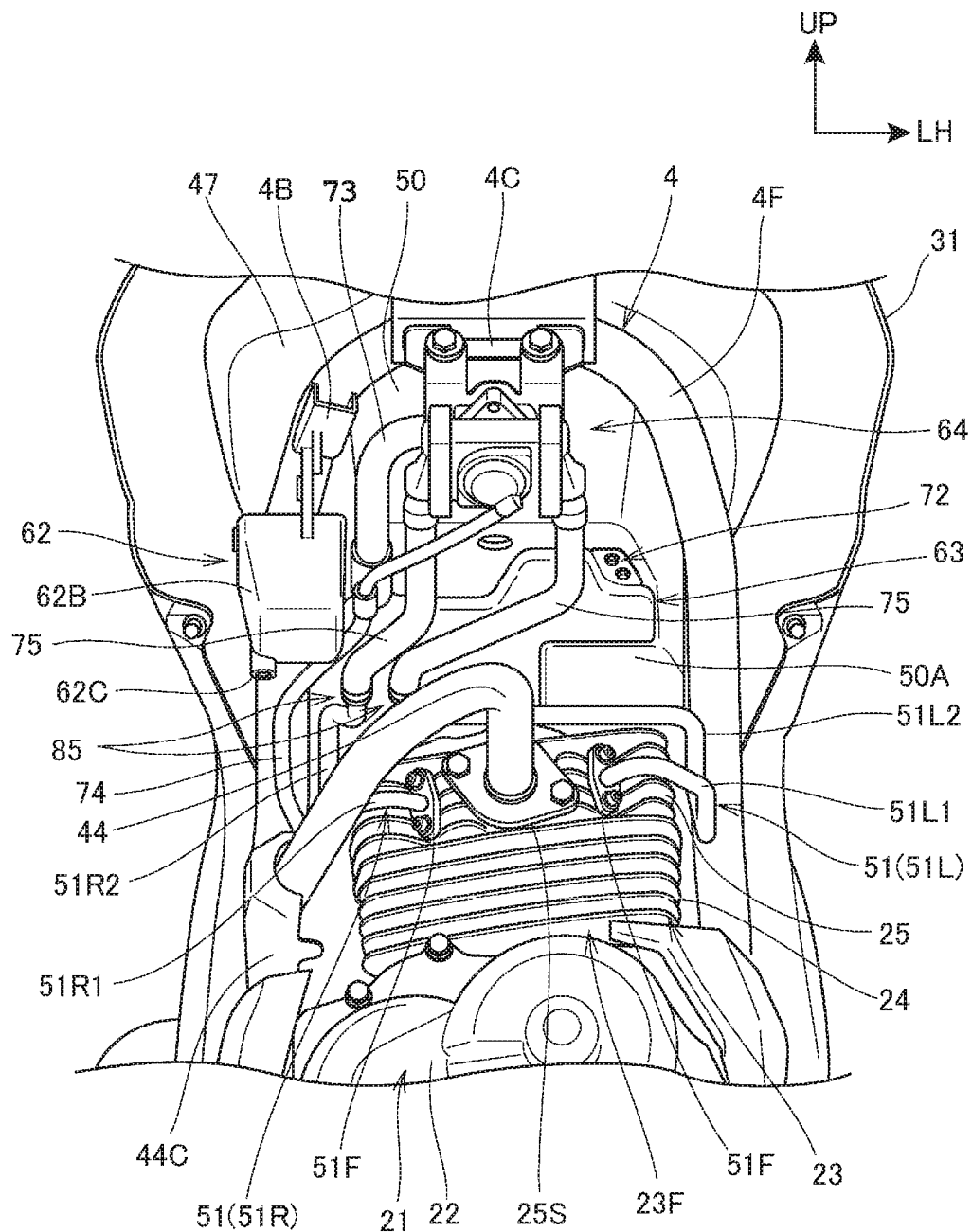
FIG. 5 is a perspective view of the fuel tank seen obliquely from a front lower side together with its surroundings.

FIG. 4 is a view of the fuel tank 47 seen obliquely from a right lower side together with its surroundings. FIG. 5 is a view of the fuel tank 47 seen obliquely from a front lower side together with its surroundings.

As shown in FIGS. 3 to 5, a heat shield member 50 is disposed under the fuel tank 47. This heat shield member 50 is formed of a plate-shaped member extending in such a way as to cover the fuel tank 47 from below and provides a thermal shield to prevent transfer of radiated heat from the engine 21 to the fuel tank 47.

As shown in FIG. 5, an exhaust outlet portion 25S is provided in the front surface of the cylinder head 25 at the center thereof in the left-right direction, the exhaust outlet portion 25S being a portion to which the exhaust pipe 44 is connected. A pair of right and left secondary-air supply pipes 51 are mounted to the right and left of this exhaust outlet portion 25S, the secondary-air supply pipes 51 communicating with an exhaust port 25H (FIG. 8A to be mentioned later) in the cylinder head 25.

The pair of right and left secondary-air supply pipes 51 are components which constitute part of a secondary-air supply device 52 configured deliver secondary air into the exhaust port 25H in the cylinder head 25 to burn unburned gas.

Before describing the secondary-air supply pipes 51, the structure upstream of the secondary-air supply pipes 51 (hereinafter referred to as "upstream component 61") will be described.

Figure 6:
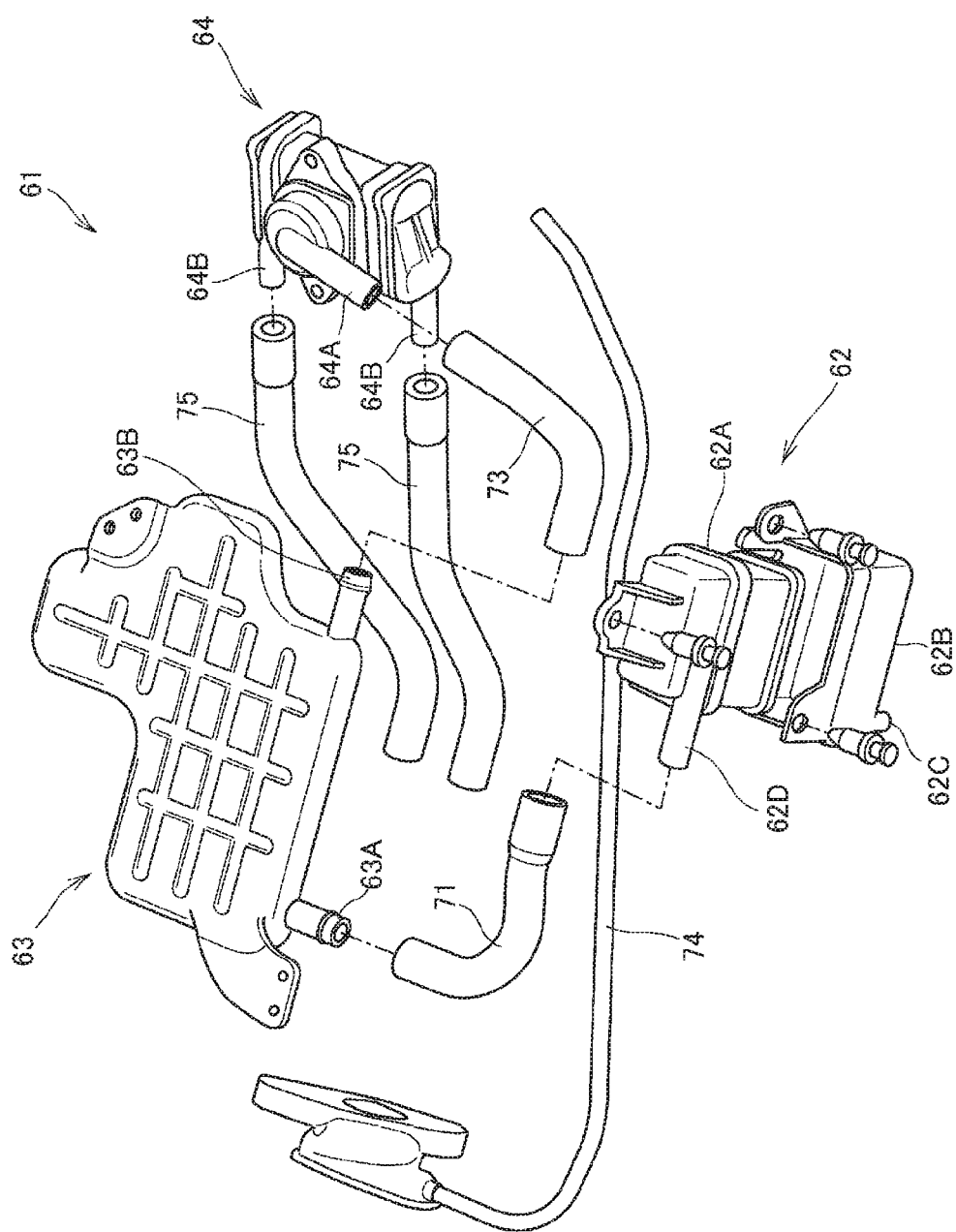
FIG. 6 is an exploded perspective view showing components upstream of secondary-air supply pipes.

FIG. 6 is an exploded perspective view showing the upstream component 61 upstream of the secondary-air supply pipes 51.

The upstream component 61 includes a sub air cleaner 62, a chamber 63, and a secondary-air control device 64 in this order from the upstream side. The sub air cleaner 62 includes a sub-air-cleaner main part 62A configured to take in and discharge ambient air and a cover 62B functioning as a protector to protect the sub-air-cleaner main part 62A. Note that as shown in FIG. 4, an air intake hole 62H from which to take in ambient air is provided in the bottom of the sub-air-cleaner main part 62A at a plurality of positions (two positions in this structure) at a given interval in the front-rear direction.

The sub air cleaner 62 is supported on one of the front upper frames 4F with a bracket 4B (FIG. 5). As shown in FIGS. 4 and 5, the sub air cleaner 62 is thus disposed under the fuel tank 47, above the crankcase 22 of the engine 21, and forward of the cylinder section 23 at a position offset to any one of the right side and the left side (to the right side in this structure).

As a result, as shown in FIGS. 3 to 5, the sub air cleaner 62 is disposed at a position between the cylinder head 25 and the secondary-air control device 64 disposed forward of the cylinder head 25 such that the upper side of the sub air cleaner 62 is covered by the fuel tank 47.

The cover 62B of the sub air cleaner 62 is formed in a box shape having a bottom and opening at the top and is provided with a drain hole 62C through which, if rainwater is accumulated inside, the rainwater is drained off to the lower side. The sub-air-cleaner main part 62A is configured to take in ambient air, clean it, and discharge it as secondary air. In this structure, an air discharge portion 62D serving as an air outlet is provided on the back surface of the sub-air-cleaner main part 62A, and a first upstream secondary-air supply pipe 71 (FIG. 6) is connected thereto from the rear side. By the virtue of such a structure, the front side of the cover 62B is formed as a closed surface, thereby preventing entrance of dust from the front side and reducing contamination and damage.

Moreover, since this sub air cleaner 62 is disposed under the fuel tank 47, the space under the fuel tank 47 can be effectively utilized. In addition, such arrangement can use the fuel tank 47 and the tank cover 31 also as cover members for covering the upper side of the sub air cleaner 62. This enables greater reduction of contamination and damage. The first upstream secondary-air supply pipe 71 will hereinafter be referred as "first air pipe 71."

The first air pipe 71 is formed of a single flexible pipe made from a flexible material having flexibility such as rubber or resin. The front end, or the upstream end, of this first air pipe 71 is connected to the air discharge portion 62D of the sub air cleaner 62. A rear section of the first air pipe 71 is bent toward the left side, which is the inner side in the vehicle width direction, and the rear end, or the downstream end, thereof is connected to an air inlet portion 63A protruding toward the right side, which is the outer side in the vehicle width direction, from a rear section of the chamber 63.

Thus, the first air pipe 71 is disposed under the fuel tank 47 as shown in FIG. 5 at a position offset to any one of the right side and the left side (to the right side in this structure) in a top view (corresponding to a plan view). Such arrangement can effectively utilize the space under the fuel tank 47 and, in addition, use the fuel tank 47 and the tank cover 31 also as cover members for covering the upper side of the first air pipe 71. This enables reduction of contamination, damage, and the like. The arrangement can also suppress the increase in the temperature of the first air pipe 71 due to radiated heat from the exhaust pipe 44, which is connected to the center of the cylinder head 25 in the left-right direction.

As shown in FIG. 6, the chamber 63 is formed in a flat hollow shape with relatively small vertical thickness. As shown in FIG. 4, the chamber 63 is fastened to the lower surface of the heat shield member 50 by a plurality of fastening members 72 at positions spaced from each other in the front-rear direction and in the left-right direction. This chamber 63 is formed in such a substantially L-shape in a top view as to keep away from a downwardly bulging portion 50A on the lower surface of the heat shield member 50 (a portion bulging to keep away from a fuel pipe not shown), and is provided forward of the space above the cylinder section 23 of the engine 21.

In this way, the chamber 63 can be fixed by utilizing the heat shield member 50 and, in addition, the chamber 63 can be prevented from greatly bulging downward. Moreover, the chamber 63 can be disposed at a position where it can avoid the influence of heat from the cylinder section 23.

The chamber 63 functions as an air tank configured to store the secondary air and also functions as a resonator configured to lower operating noise generated during the supplying of the secondary air by utilizing the principle of Helmholtz resonance. Note that it is possible not only to lower the volume of the noise but also to adjust the quality of the noise by appropriately adjusting the resonance frequency of the chamber 63.

As shown in FIG. 6, an air outlet portion 63B of the chamber 63 protrudes forward from any one of the right side and the left side of a front section of the chamber 63 (from the right side in this structure). The rear end, or the upstream end, of a second upstream secondary-air supply pipe 73 (hereinafter referred to as "second air pipe 73") is connected to this air outlet portion 63B. The front end, or the downstream end, of this second air pipe 73 is connected to a single air inlet portion 64A provided on the secondary-air control device 64.

The secondary-air control device 64 is mounted to the front end of the pair of front upper frames 4F with a bracket 4C (FIGS. 3 to 5). Thus, as shown in FIGS. 3 to 5, the secondary-air control device 64 is disposed under a front section of the fuel tank 47, at the center in the vehicle width direction, and forward of the cylinder section 23 and the sub air cleaner 62 in a side view.

This secondary-air control device 64 includes therein two secondary-air supply control valves, also called secondary-air control valves, configured to open and close upstream of the right and left secondary-air supply pipes 51, and a reed valve for backflow prevention. The secondary-air control device 64 is connected to an intake path to the engine 21 through a negative pressure tube 74 (FIG. 6). Each secondary-air supply control valve opens to supply the secondary air to the engine 21 when the engine intake pressure is in a pressure range corresponding to a predetermined throttle open state, and closes to stop supplying the secondary air when the engine intake pressure in a pressure range corresponding to engine decelerating and idling states. Moreover, the reed valve functions as a non-return valve to prevent backflow of the secondary air.

A pair of right and left air outlet portions 64B (FIG. 6) are provided on the rear surface of this secondary-air control device 64, the air outlet portions 64B being provided downstream of the secondary-air supply control valves. These air outlet portions 64B protrude rearward and the front ends, or the upstream ends, of a pair of right and left third upstream secondary-air supply pipes 75 (hereinafter referred to as "third air pipes 75") are connected thereto, respectively.

As shown in FIG. 4, the pair of right and left third air pipes 75 extend rearward along the lower surfaces of the heat shield member 50 and the chamber 63 to any one of the right and left of the downwardly bulging portion 50A on the lower surface of the heat shield member 50 (to the right in this structure) and connect there to the front ends, or the upstream ends, of the pair of right and left secondary-air supply pipes 51 mentioned above.

Similarly to the first air pipe 71, the second air pipe 73 and the third air pipes 75 are also formed of flexible pipes made from a flexible material such as rubber or resin. On the other hand, the secondary-air supply pipes 51 which constitute the most downstream pipes of the secondary-air supply device 52 are formed of metallic pipes such as carbon steel pipes. The secondary-air supply pipes 51 are therefore pipes which have high heat resistance and are also easy to cool with traveling air as compared to the first to third air pipes 71, 73, 75.

Figure 7:
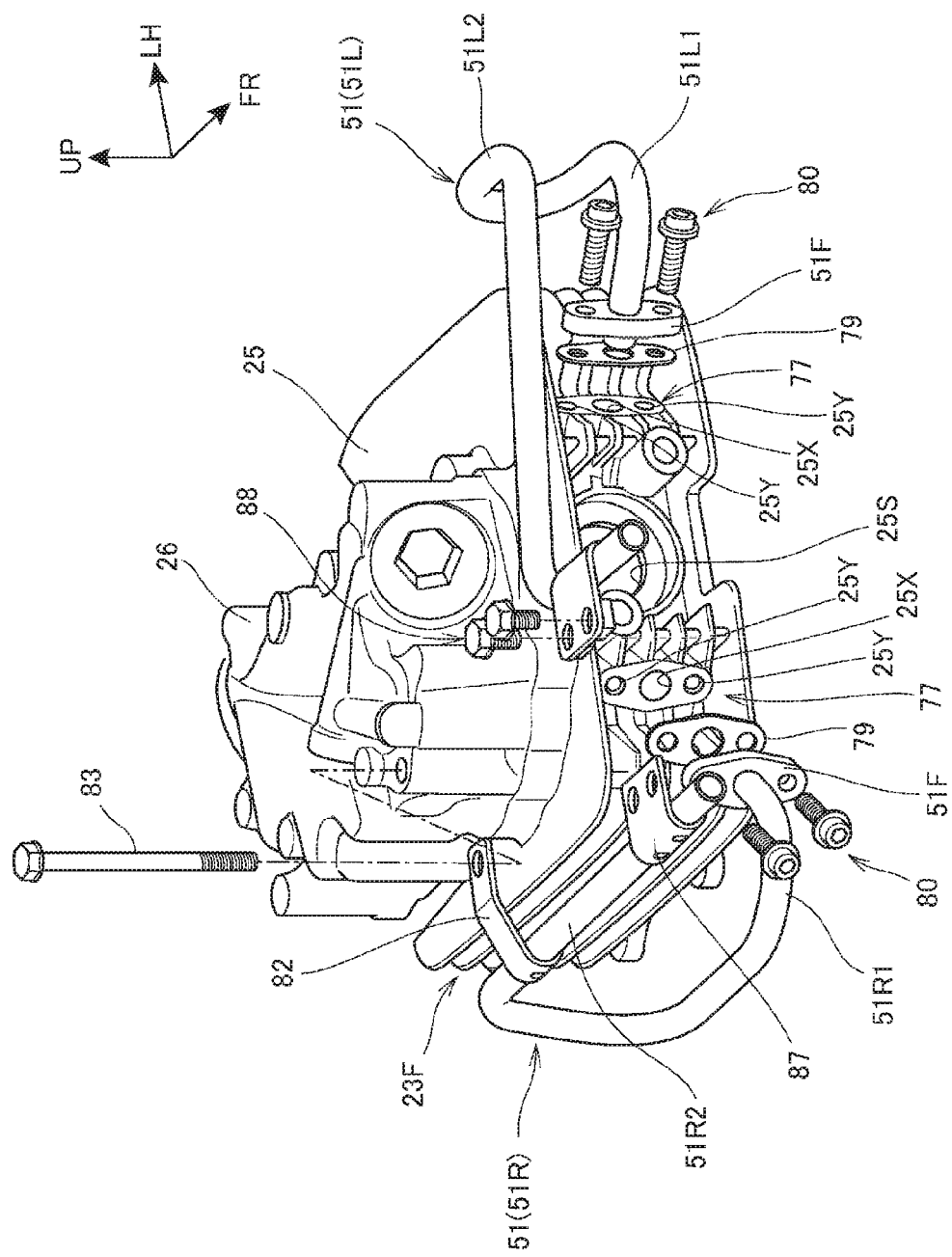
FIG. 7 is an exploded perspective view showing the secondary-air supply pipes together with a cylinder head and a head cover.
Figure 8A:
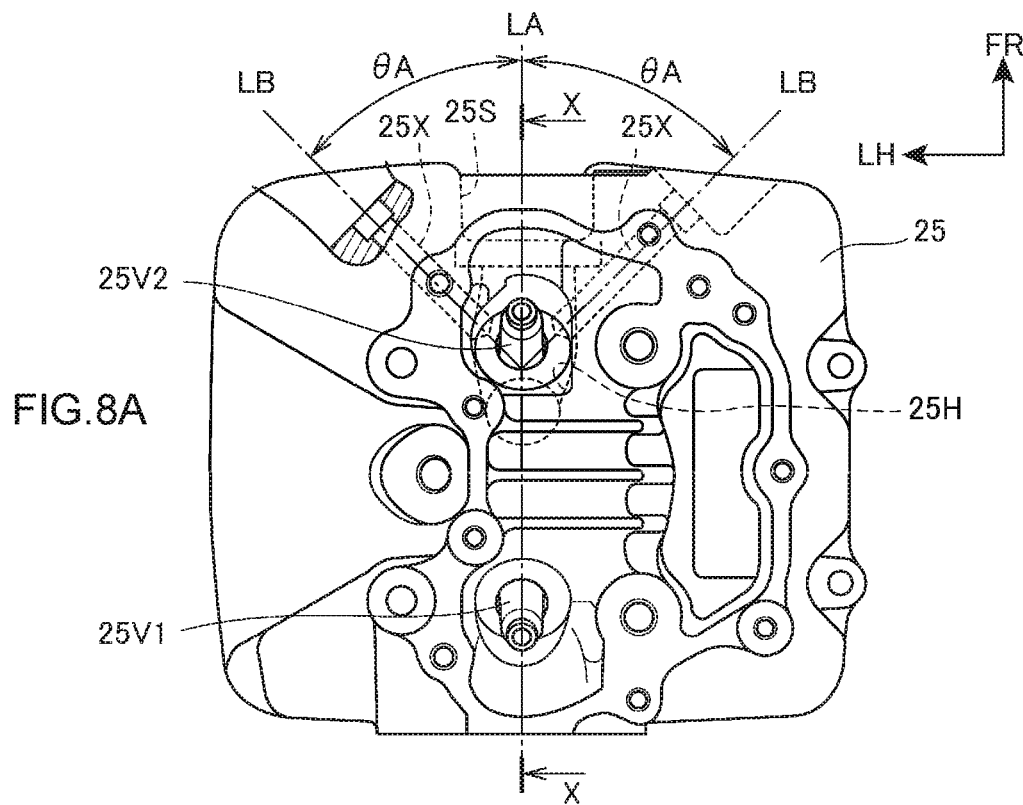
FIG. 8A and FIG. 8B are views of the cylinder head, FIG. 8A being a top view of the cylinder head, FIG. 8B being a cross-sectional view taken along line X-X in FIG. 8A.
Figure 8B:
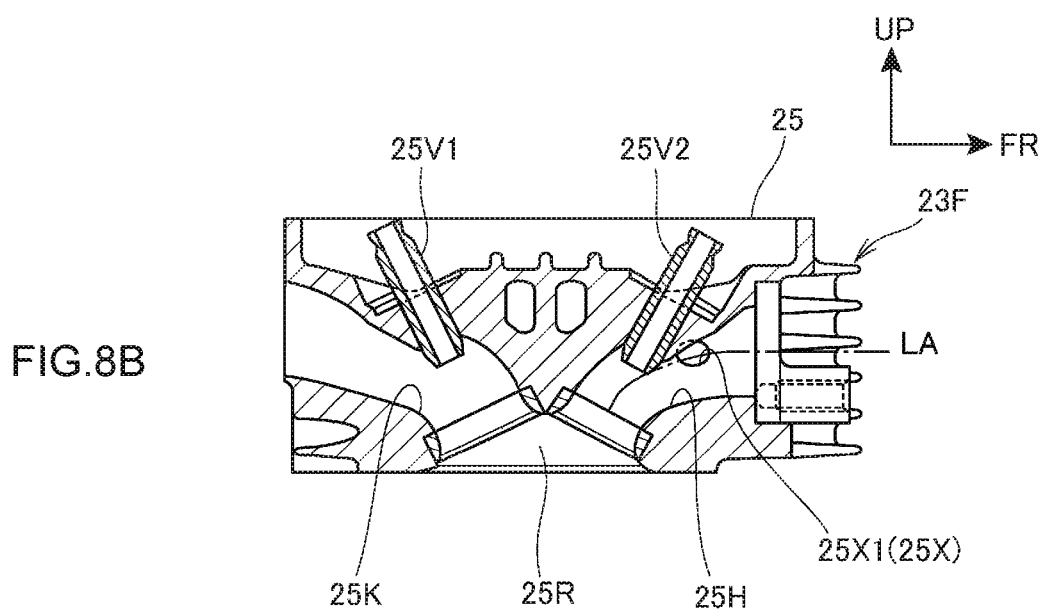

FIG. 7 is an exploded perspective view showing the secondary-air supply pipes 51 together with the cylinder head 25 and the head cover 26. FIG. 8A and FIG. 8B are views of the cylinder head 25, FIG. 8A being a top view of the cylinder head 25, FIG. 8B being a cross-sectional view taken along line X-X in FIG. 8A.

As shown in FIG. 7, an opening portion which forms the exhaust outlet portion 25S is provided in the front surface of the cylinder head 25 at the center thereof in the left-right direction. To the right and left of this exhaust outlet portion 25S, pipe connecting portions 77 are provided to which the pair of right and left secondary-air supply pipes 51 are connected, respectively.

As shown in FIG. 8A and FIG. 8B, the cylinder head 25 includes: a combustion chamber 25R; an intake port 25K communicating with this combustion chamber 25R and opening to the back surface of the cylinder head 25; the exhaust port 25H communicating with the combustion chamber 25R and opening to the front surface of the cylinder head 25; and right and left hole portions 25X extending from the right and left pipe connecting portions 77 to the exhaust port 25H. Moreover, the cooling fins 23F are provided around the periphery (on the front, rear, right, and left sides) of the cylinder head 25.

As shown in FIG. 8A, the right and left hole portions 25X penetrate center portions, in the vertical direction, of the right and left pipe connecting portions 77 and extend straight to an upstream side in the exhaust port 25H. Opening portions 25X1 shown in FIG. 8B are where the right and left hole portions 25X and the exhaust port 25H communicate with each other.

As shown in FIG. 8A, in the top view (corresponding to the plan view), these right and left hole portions 25X are formed bilaterally symmetrical with respect to an axis LA of the exhaust port 25H, and right and left hole portions 25X are formed such that their axes LB are obliquely inclined to the axis LA of the exhaust port 25H and cross each other inside the exhaust port 25H.

Specifically, in this structure, the axes LB of the right and left hole portions 25X are inclined to the exhaust port 25H and cross each other inside the exhaust port 25H in the top view, which corresponds to a view in the direction of the cylinder axis, such that the axes LB are connected to the front surface of the cylinder head 25.

In this way, as shown in FIG. 7, the hole portions 25X and the pipe connecting portions 77 do not at all influence the cooling fins 23F provided on the right and left surfaces of the cylinder head 25. Thus, it is possible to avoid decrease in the area of the cooling fins 23F on the right and left surfaces even when the structure is provided with the hole portions 25X and the pipe connecting portions 77. Hence, the area of contact with the traveling air flowing along the right and left sides of the cylinder head 25 can be sufficient, thereby allowing efficient cooling of the cylinder head 25.

Note that in this structure, an inclination angle θA of the axis LB of each hole portion 25X to the axis LA of the exhaust port 25H is set at 45 degrees. Also, the hole portion 25X is caused to communicate with the exhaust port 25H at a position which is substantially the halfway point in the entire length thereof. However, the hole portion 25X may be caused to communicate with the exhaust port 25H at a further upstream position by adjusting the inclination angle θA, and the inclination angle θA may be adjusted appropriately within the range of 0 to less than 90 degrees.

Each hole portion 25X is a long hole with a true-circle cross section extending at a constant diameter and communicates with the exhaust port 25H at the oblique inclination angle θA. Thus, as shown in FIG. 8B, the opening portion 25X1, which communicates with the exhaust port 25H, has an elliptical shape larger in area than the true-circle cross section. Hence, the area of the communication between each hole portion 25X and the exhaust port 25H can be increased. Via the setting of this inclination angle θA, each hole portion 25X can be caused to communicate with the exhaust port 25H on a further upstream side.

Moreover, as shown again in FIG. 8B, in the side view, each opening portion 25X1 is provided at a position coinciding with the axis LA of the exhaust port 25H. In this way, the secondary air from each hole portion 25X can be supplied toward the axis LA of the exhaust port 25H.

With the these components, when the secondary air is supplied to each hole portion 25X, the secondary air can be easily mixed with exhaust gas flowing through the exhaust port 25H. Thus, the exhaust-gas purification performance is easily enhanced. Moreover, the secondary air is supplied from the right and left hole portions 25X and, in addition, the chamber 63 configured to temporarily store the secondary air is provided. Thus, a large amount of secondary air can be supplied as compared to a case where there is only one hole portion 25X.

Accordingly, a sufficient amount of secondary air can be supplied and the exhaust-gas purification performance can therefore be efficiently enhanced. Meanwhile, in FIG. 8B, reference numeral 25V1 denotes a tube supporting an intake valve configured to open and close the intake port 25K, and reference numeral 25V2 denotes a tube supporting an exhaust valve configured to open and close the exhaust port 25H.

As shown in FIG. 7, the front surfaces of the right and left pipe connecting portions 77 are each a surface facing the outer side in the vehicle width direction. The hole portion 25X opens at the center of this front surface in the vertical direction. Moreover, a pair of upper and lower internally threaded portions 25Y are provided above and under this hole portion 25X. A flange portion 51F provided at the downstream end of each secondary-air supply pipe 51 is placed on the front surface of the corresponding pipe connecting portion 77 with a gasket 79 therebetween, and a pair of upper and lower fastening members 80 are fastened in the internally threaded portions 25Y, respectively. In this way, the secondary-air supply pipe 51 is easily detachably connected to the pipe connecting portion 77.

In the following, when description is given with the right and left secondary-air supply pipes 51 distinguished from each other, the right one is described as the secondary-air supply pipe 51R and the left one is described as the secondary-air supply pipe 51L.

Figure 9:
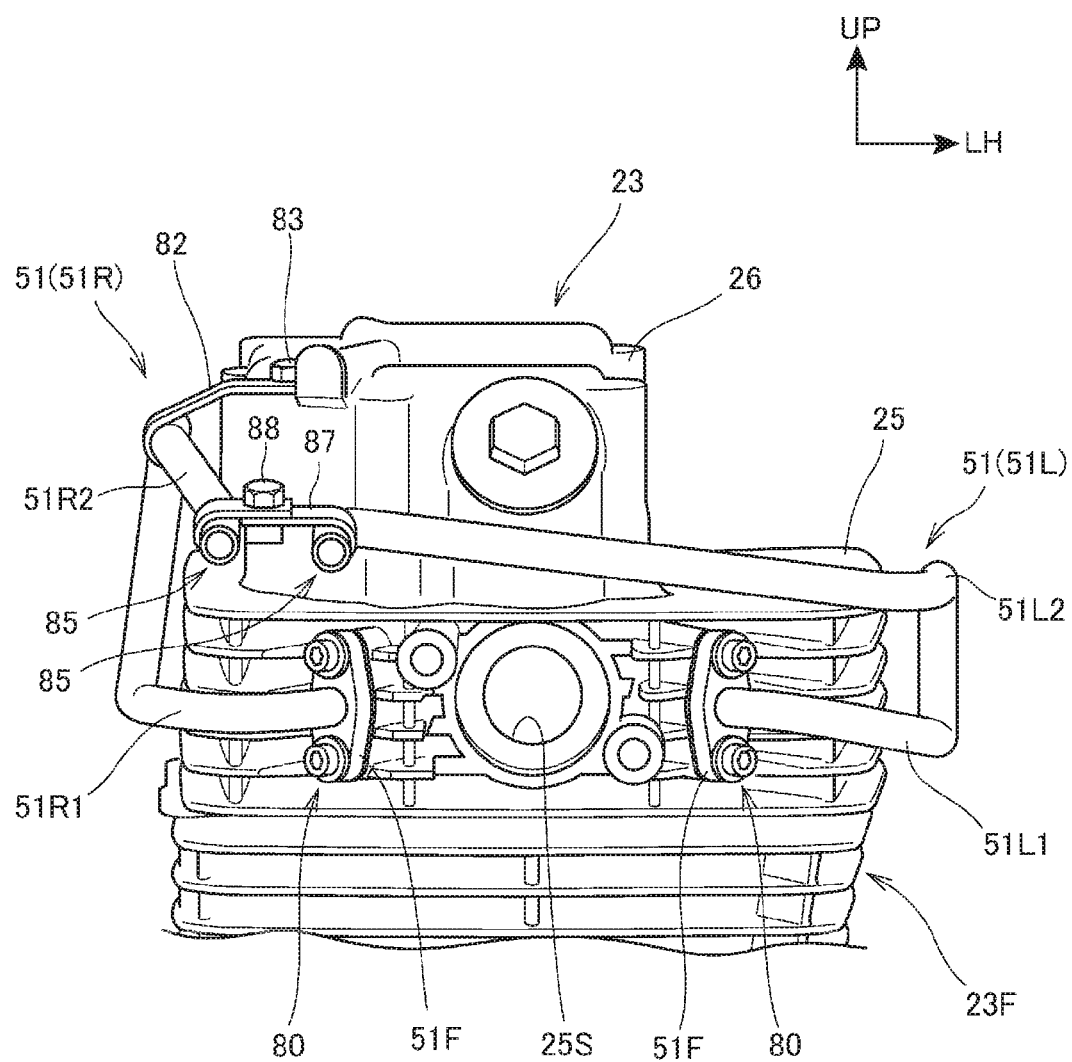
FIG. 9 is a view of a state where the secondary-air supply pipes are connected, seen from the front side together with a cylinder section.
Figure 10:
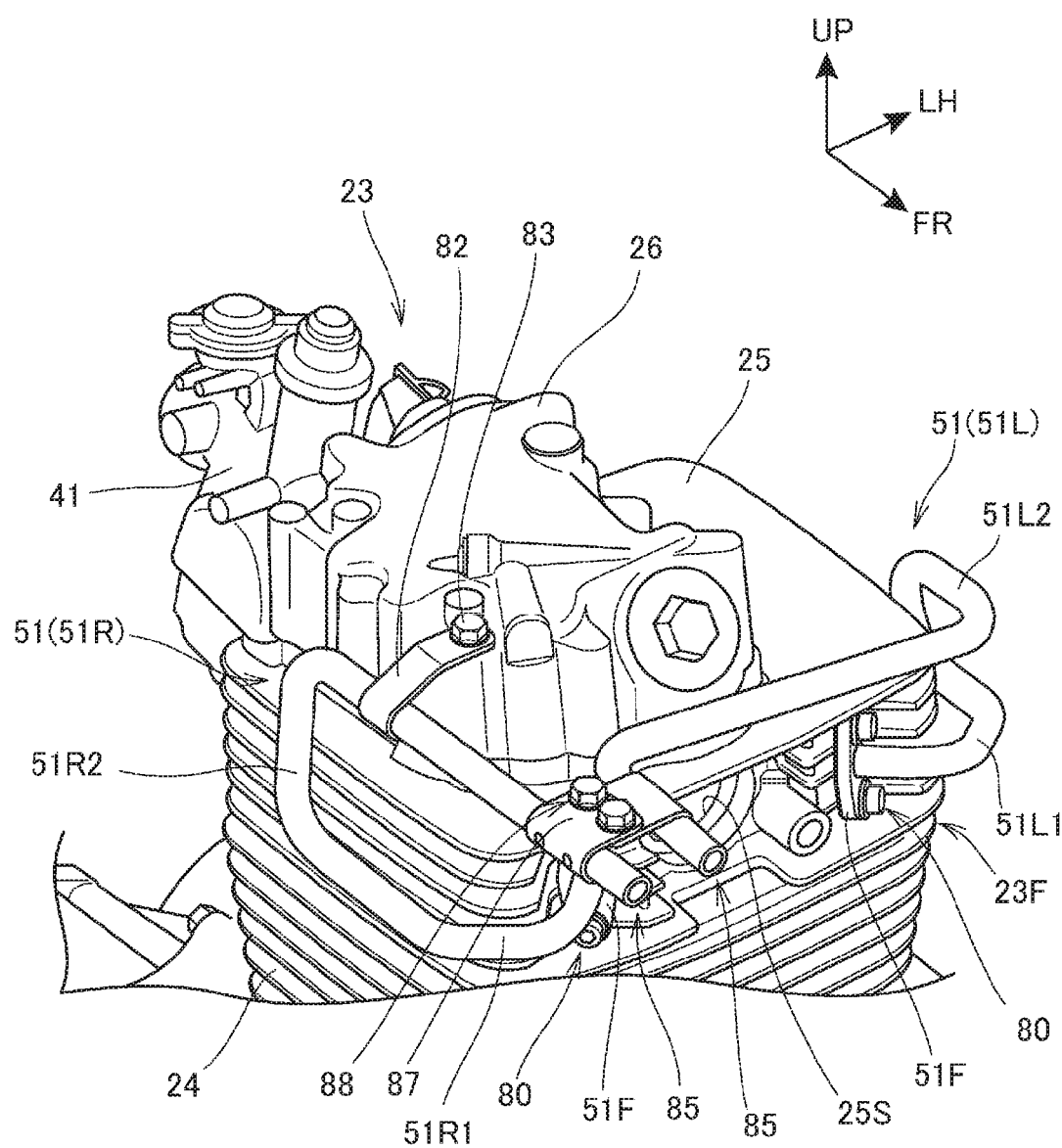
FIG. 10 is a view of the state where the secondary-air supply pipes are connected, seen obliquely from a right upper side together with the cylinder section.

FIG. 9 is a view of a state where the secondary-air supply pipes 51 are connected, seen from the front side together with the cylinder section 23. FIG. 10 is a view of the same seen obliquely from a right upper side.

The right secondary-air supply pipe 51R is formed as a pipe including a vehicle-width-direction outwardly extending pipe 51R1 and a bent-back pipe section 51R2 in the form of a single integral piece. The vehicle-width-direction outwardly extending pipe 51R1 extends toward the front side and the right side, which is the outer side in the vehicle width direction, from the flange portion 51F. The bent-back pipe section 51R2 extends toward the rear side from the vehicle-width-direction outwardly extending pipe 51R1 along the right surface of the cylinder head 25 and is bent back toward the front side. In other words, the bent-back pipe section 51R2 is formed in a tubular shape that is bent in a rearwardly-protruding U-shape.

With the vehicle-width-direction outwardly extending pipe 51R1, the secondary-air supply pipe 51R can be formed as a pipe extending from the front surface of the cylinder head 25 to a position by the right surface of the cylinder head 25, and the bent-back pipe section 51R2 connected to the upstream side of this vehicle-width-direction outwardly extending pipe 51R1 can be disposed by utilizing the space outward of the right surface of the cylinder head 25. Since this bent-back pipe section 51R2 is disposed along the right surface of the cylinder head 25, the bent-back pipe section 51R2 can be compactly disposed by the cylinder head 25

Note that the bent-back pipe section 51R2 is not brought into contact with the right surface of the cylinder head 25, but is disposed in parallel to the cylinder head 25 with a certain gap between itself and the cylinder head 25. In FIGS. 9 and 10, reference numeral 82 is a stay provided on the bent-back pipe section 51R2, and this stay 82 is fastened to the head cover 26 by using the same fastening member 83 used to fix the head cover 26 to the cylinder head 25. In this way, the bent-back pipe section 51R2 can be supported on the head cover 26 in a simple manner without increasing the number of components.

Since this bent-back pipe section 51R2 is disposed by the side of the cylinder head 25, the secondary-air supply pipe 51R can be cooled by utilizing traveling air flowing along the side of the cylinder head 25. Since the side of the cylinder head 25 is a region where a comparatively large volume of air flows during travel, the heat exchange can be promoted and the bent-back pipe section 51R2 can be effectively cooled as compared to a case where the bent-back pipe section 51R2 is disposed in front of the cylinder head 25.

Also, since the vehicle-width-direction outwardly extending pipe 51R1 is directly connected to the cylinder head 25, a certain amount of heat is expected to be transferred from the cylinder head 25 even with the gasket 79 between them. However, even when the heat is transferred to the vehicle-width-direction outwardly extending pipe 51R1, the bent-back pipe section 51R2 cools the transferred heat and can therefore suppress the increase in the temperature of the secondary-air supply pipe 51R. Thus, the heat transfer to the upstream secondary-air supply pipes (such as the third air pipe 75) can be sufficiently reduced. No special measure against heat is therefore needed such as disposing an exclusive heat shield plate between the secondary-air supply pipe 51R and the cylinder head 25.

In addition, this bent-back pipe section 51R2 extends forward beyond the cylinder head 25 and its front end is connected to the rear end of the corresponding third air pipe 75. The third air pipe 75 is thus situated forward of the cylinder head 25, as shown in FIG. 3. In this way, it is possible to suppress the increase in the temperature of the third air pipe 75 due to radiated heat from the cylinder head 25.

Further, since the secondary-air supply pipe 51R includes the bent-back pipe section 51R2, the pipe length thereof from the flange portion 51F, which is the connecting portion to the cylinder head, to the third air pipe 75 is accordingly longer. This extra length can also make it harder for the heat from the cylinder head 25 to be transferred to the upstream secondary-air supply pipes (such as the third air pipe 75).

Thus, no special measure against heat is needed although the upstream secondary-air supply pipes (such as the third air pipe 75) use resin, rubber, or the like, which has lower heat resistance than metallic pipes. Also, the use of flexible pipes as the upstream secondary-air supply pipes (such as the third air pipe 75) allows easy routing of these pipes and easy mounting work.

Next, the left secondary-air supply pipe 51L will be described. This secondary-air supply pipe 51L is formed as a pipe including a vehicle-width-direction outwardly extending pipe 51L1 and a bent-back pipe section 51L2 in the form of a single integral piece. The vehicle-width-direction outwardly extending pipe 51L1 extends toward the front side and the left side, which is the outer side in the vehicle width direction, from the flange portion 51F. The bent-back pipe section 51L2 extends toward the rear side from the vehicle-width-direction outwardly extending pipe 51L1 along the left surface of the cylinder head 25 and is bent back toward the front side.

With this vehicle-width-direction outwardly extending pipe 51L1, the secondary-air supply pipe 51L can be formed as a pipe extending from the front surface of the cylinder head 25 to a position by the left surface of the cylinder head 25, and the bent-back pipe section 51L2 connected to the upstream side of this vehicle-width-direction outwardly extending pipe 51L1 can be disposed by utilizing the space outward of the left surface of the cylinder head 25. In addition, since this bent-back pipe section 51L2 is disposed along the left surface of the cylinder head 25, the bent-back pipe section 51L2 can be compactly disposed by the cylinder head 25

Similarly to the right bent-back pipe section 51R2, the bent-back pipe section 51L2 is also formed in a tubular shape that is bent in a rearwardly-protruding U-shape. Also, the bent-back pipe section 51L2 is not brought into contact with the surface (left surface) of the cylinder head 25, but is disposed in parallel to the cylinder head 25 with a certain gap between itself and the cylinder head 25. In this way, the secondary-air supply pipe 51L can be efficiently cooled by utilizing traveling air flowing along the left side of the cylinder head 25.

Note that this bent-back pipe section 51L2 is formed shorter in length than the right bent-back pipe section 51R2. The reason the bent-back pipe section 51L2 is formed shorter is that the right and left secondary-air supply paths from the secondary-air control device 64 to the cylinder head 25 should be equal in length.

Meanwhile, as shown in FIG. 10, the bent-back pipe section 51L2 passes the space above the cylinder head 25 and forward of the head cover 26 to the right side, or the opposite side in the vehicle width direction, of the cylinder head 25, and are then bent forward and connected to the corresponding third air pipe 75 on the upstream side. In this structure, as shown again in FIG. 10, the right and left bent-back pipe section 51R2, 51L2, which are metallic pipes, and the right and left third air pipes 75, which are flexible pipes, are adjacent to each other at connecting portions 85 where they are connected to each other. These adjacent spots are coupled to each other by a stay 87 with fastening members 88. In this way, the right and left secondary-air supply pipes 51R, 51L can be supported with sufficient supporting force.

Moreover, as shown in FIG. 5, the spots mentioned above, in which the connecting portions 85 are adjacent to each other, are situated to be offset from the exhaust pipe 44 to any one of the right side and the left side (to the right side in this structure) in the top view. The connecting portions 85 can therefore reduce the influence of radiated heat from the exhaust pipe 44 disposed at the center in the vehicle width direction. Thus, the right and left secondary-air supply pipes 51R, 51L can be provided such that heat transferred thereto from the cylinder head 25 can be cooled with traveling air and also that the influence of heat from the exhaust pipe 44 can be reduced as well. Moreover, since the secondary-air supply pipes 51R, 51L extend along the cylinder head 25, they can be compactly disposed by utilizing empty spaces around the cylinder head 25.

As described above, according to this embodiment, as shown in FIG. 10, the cylinder block 24 and the cylinder head 25 are provided which extend upwardly from the crankcase 22; the right and left secondary-air supply pipes 51R, 51L are provided which are connected to the right and left of the exhaust outlet portion 25S of the cylinder head 25 and through which the secondary air is supplied to the exhaust port 25H; the right and left secondary-air supply pipes 51R, 51L extend from the front surface of the cylinder head 25 to the right and left of the cylinder head 25, respectively, and include the bent-back pipe sections 51R2, 51L2 extending along the right and left surfaces of the cylinder head 25 and are bent back toward the front side. In this way, it is possible to efficiently cool the secondary-air supply pipes 51R, 51L by utilizing cooling air flowing along the sides of the cylinder head 25 and also to compactly dispose the secondary-air supply pipes 51R, 51L along the right and left surfaces of the cylinder head 25.

Also, the cylinder head 25 includes the cooling fins 23F at least on its right and left surfaces and, as shown in FIG. 8A, the axes LB of the connecting paths connecting the right and left secondary-air supply pipes 51R, 51L and the exhaust port 25H to each other are inclined to the exhaust port 25H and cross each other inside the exhaust port 25H in the view in the direction of the cylinder axis. In this way, it is possible to avoid decrease in the area of the cooling fins 23F on the right and left surfaces and also to supply the secondary air to a further upstream side in the exhaust port 25H. Hence, the exhaust-gas purification performance is easily enhanced, in combination with the cooling effect achieved by the structure in which the connecting portions 85 of the secondary-air supply pipes 51R, 51L face the front surface of the cylinder head 25.

Also, as shown in FIGS. 4 and 5, the secondary-air control device 64 provided upstream of the bent-back pipe sections 51R2, 51L2 is disposed forward of the cylinder head 25 and under the fuel tank 47, and the first air pipe 71 as an upstream secondary-air supply pipe and the sub air cleaner 62 provided upstream of the secondary-air control device 64 are disposed under the fuel tank 47 and offset from the exhaust pipe 44 to any one of the right side and the left side in the plan view. In this way, it is possible to dispose the secondary-air control device 64 and the sub air cleaner 62 by utilizing the space under the fuel tank 47 and also to suppress the increase in the temperature of the secondary-air control device 64, the first air pipe 71, and the sub air cleaner 62 due to radiated heat from the cylinder head 25 and the exhaust pipe 44. Thus, the exhaust-gas purification performance is easily enhanced.

Also, as shown in FIG. 3, the sub air cleaner 62 is disposed at a position between the secondary-air control device 64 and the cylinder head 25 in the side view such that its upper side is covered by the fuel tank 47. In this way, it is possible to dispose the sub air cleaner 62 by utilizing the space under the fuel tank 47 and also to reduce contamination and damage of the sub air cleaner 62.

Also, as shown in FIG. 4, the heat shield member 50 is provided under the fuel tank 47, the chamber 63 functioning as a resonator is provided between the sub air cleaner 62 and the secondary-air control device 64, and the chamber 63 is supported on the heat shield member 50. In this way, it is possible to dispose the resonator by effectively utilizing the space between the sub air cleaner 62 and the secondary-air control device 64 and also to lower the operating noise generated during the supplying of the secondary air. In addition, no exclusive component is needed to mount the resonator and the number of components can therefore be reduced.

Also, the secondary-air supply pipes 51R, 51L on the cylinder head 25 side are formed of metallic pipes whereas the third air pipes 75, which are secondary-air supply pipes on the secondary-air control device 64 side, are formed of flexible pipes having flexibility and, as shown in FIG. 4, the connecting portions 85 of the secondary-air supply pipes 51R, 51L, which are metallic pipes, and the third air pipes 75, which are flexible pipes, are adjacent to each other and offset from the exhaust pipe 44 to any one of the right side and the left side in the plan view. In this way, a measure against heat can be provided to the cylinder head side while the flexible pipes side can be easily routed. In addition, these pipes can be compactly disposed.

Also, the sub air cleaner 62 includes the cover 62B, the first air pipe 71 is connected to the sub air cleaner 62 from the rear side, and the front side of the cover 62B is a closed surface. In this way, it is possible to obtain an improved measure against dust.

The embodiment described above merely represents one mode of the present application, and any modifications and applications are possible without departing from the gist of the present application.

Figure 11:
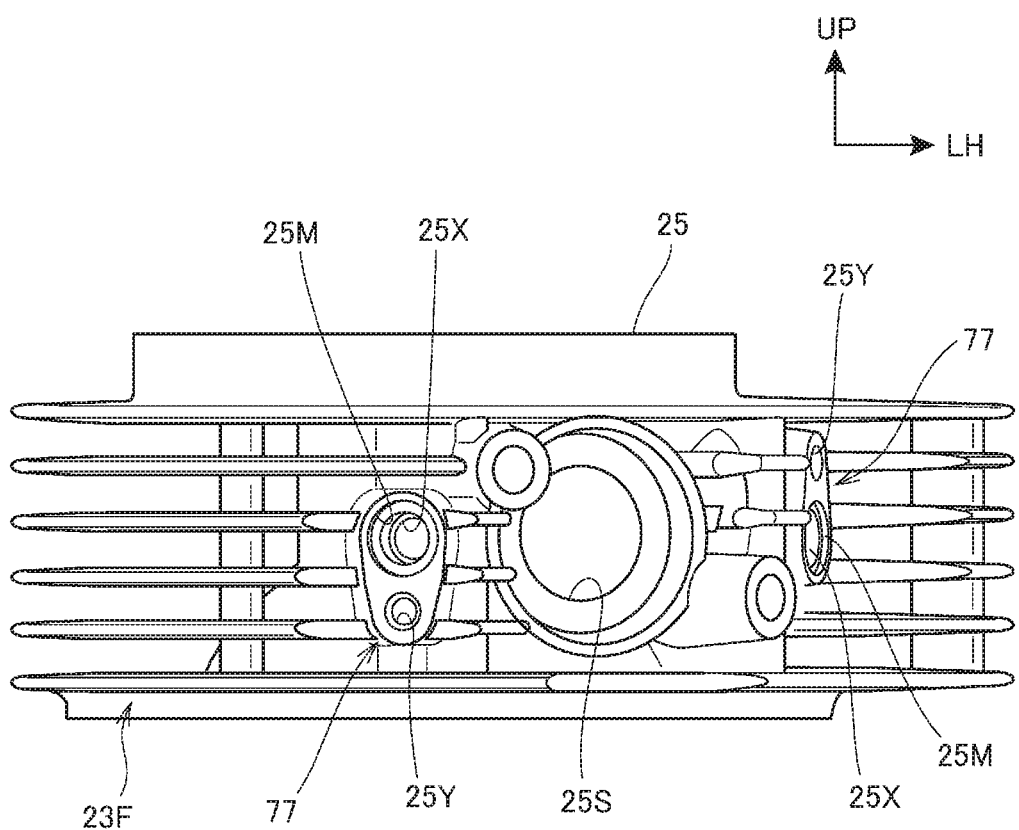
FIG. 11 is a view showing a modification of pipe connecting portions of the cylinder head.

For example, in the above embodiment, the case has been exemplarily described in which the gasket 79 is interposed between each secondary-air supply pipe 51 and the cylinder head 25 to close the gap between the secondary-air supply pipe 51 and the cylinder head 25, but the present application is not limited to such a case. For example, an O-ring may be used to close the gap between the secondary-air supply pipe 51 and the cylinder head 25. FIG. 11 is a view showing an example of the pipe connecting portions 77 of the cylinder head 25 each using an O-ring.

As shown in FIG. 11, the right and left pipe connecting portions 77 of the cylinder head 25 each includes on hole portion 25X communicating with the exhaust port 25H and one internally threaded portion 25Y, and an O-ring groove 25M larger in diameter than the hole portion 25X is provided in the upstream end of the hole portion 25X. According to this structure, the flange portions 51F (FIG. 7) of the secondary-air supply pipes 51R, 51L are placed on these pipe connecting portions 77 after O-rings not shown are set in their O-ring grooves 25M, and the fastening members 80 (FIG. 7) are inserted from outside through the flange portions 51F and fastened into the internally threaded portions 25Y. As a result, the secondary-air supply pipes 51 and the cylinder head 25 are connected to each other with the gaps therebetween closed.

Also, the structure shown in FIG. 11 employs a one-side fastening structure in which one internally threaded portion 25Y is provided to each of the right and left pipe connecting portions 77. The size of the pipe connecting portions 77 can thus be reduced accordingly. Meanwhile, in the structure in FIG. 11, the internally threaded portions 25Y on the left and right sides are given at different positions in the vertical direction such that the right pipe connecting portion 77 includes its internally threaded portion 25Y under its hole portion 25X whereas the left pipe connecting portion 77 includes its internally threaded portion 25Y above its hole portion 25X.

In the above embodiment, the routing of the pipes of the secondary-air supply device 52 is not limited to the one described above and may be changed as appropriate. For example, the bent-back pipe sections 51R2, 51L2 of the secondary-air supply pipes 51R, 51L may be bent back a plurality of times or routed differently as appropriate within the regions along the right and left surfaces of the cylinder head 25 where they are extended and bent back toward the front side.

Also, in a case, for example, where the shape of the heat shield member 50, the exhaust pipe 44, and the like are bilaterally symmetrical unlike the above embodiment, the components of the secondary-air supply device 52 including its pipes may be bilaterally symmetrical. In short, the routing of the pipes and the like should be changed as appropriate in accordance with the shapes of components around the secondary-air supply device 52 (such as the heat shield member 50 and the exhaust pipe 44).

Further, in the above embodiment, the case has been described in which the present application is applied to the saddle-ride type vehicle 1 shown in FIG. 1, but the present application is not limited to such a case. The present application may be applied to other four- or three-wheeled vehicles called ATV. Moreover, the present application may be applied to two-wheeled vehicles such as motorcycles (including motorized bicycles). The present application is widely applicable at least to publicly-known saddle-ride type vehicles which the rider rides by straddling the vehicle body.

EXPLANATION OF THE REFERENCE NUMERALS

1 SADDLE-RIDE TYPE VEHICLE
4 VEHICLE BODY FRAME
21 ENGINE
22 CRANKCASE
23 CYLINDER SECTION
23F COOLING FIN
24 CYLINDER BLOCK
25 CYLINDER HEAD
25H EXHAUST PORT
25S EXHAUST OUTLET PORTION
26 HEAD COVER
44 EXHAUST PIPE
47 FUEL TANK
50 HEAT SHIELD MEMBER
51R, 51L SECONDARY-AIR SUPPLY PIPE
51R1, 51L1 VEHICLE-WIDTH-DIRECTION OUTWARDLY EXTENDING PIPE
51R2, 51L2 BENT-BACK PIPE SECTION
62 SUB AIR CLEANER
63 CHAMBER (RESONATOR)
64 SECONDARY-AIR CONTROL DEVICE
71 FIRST AIR PIPE (UPSTREAM SECONDARY-AIR SUPPLY PIPE)
73 SECOND AIR PIPE (UPSTREAM SECONDARY-AIR SUPPLY PIPE)
75 THIRD AIR PIPE (UPSTREAM SECONDARY-AIR SUPPLY PIPE)
79 GASKET
85 CONNECTING PORTION

What is claimed is:

1. A secondary-air supply structure for a saddle-ride type vehicle, the secondary-air supply structure including a cylinder block and a cylinder head which extend upward from a crankcase, an exhaust port which is provided inside the cylinder head and communicates with a combustion chamber, and an exhaust outlet portion which is provided in a front surface of the cylinder head and communicates with the exhaust port and to which an exhaust pipe is connected, the secondary-air supply structure comprising right and left secondary-air supply pipes which are connected to right and left of the exhaust outlet portion of the cylinder head and through which secondary air is supplied to the exhaust port,
wherein the right and left secondary-air supply pipes extend from the front surface of the cylinder head to right and left of the cylinder head, respectively, and include bent-back pipe sections extending along right and left surfaces of the cylinder head and bent back toward a front side.

2. The secondary-air supply structure for a saddle-ride type vehicle according to claim 1,
wherein the cylinder head includes cooling fins at least on the right and left surfaces thereof, and
axes of connecting paths connecting the right and left secondary-air supply pipes and the exhaust port to each other are inclined to the exhaust port and cross each other inside the exhaust port in a view in a direction of a cylinder axis.

3. The secondary-air supply structure for a saddle-ride type vehicle according to claim 1, further comprising:
a fuel tank disposed above the cylinder head;
a secondary-air control device disposed forward of the cylinder head and under the fuel tank and provided upstream of the bent-back pipe sections; and
a sub air cleaner provided upstream of the secondary-air control device,
wherein the sub air cleaner is disposed under the fuel tank and offset from the exhaust pipe to any one of a right side and a left side in a plan view.

4. The secondary-air supply structure for a saddle-ride type vehicle according to claim 3, wherein the sub air cleaner is disposed at a position between the secondary-air control device and the cylinder head in a side view such that an upper side of the sub air cleaner is covered by the fuel tank.

5. The secondary-air supply structure for a saddle-ride type vehicle according to claim 4, further comprising:
a heat shield member provided under the fuel tank; and
a resonator provided between the sub air cleaner and the secondary-air control device,
wherein the resonator is supported on the heat shield member.

6. The secondary-air supply structure for a saddle-ride type vehicle according to claim 3,
wherein the secondary-air supply pipes on the cylinder head side are formed of metallic pipes while upstream secondary-air supply pipes on the secondary-air control device side are formed of flexible pipes having flexibility, and
connecting portions of the metallic pipes and the flexible pipes at which the metallic pipes and the flexible pipes are connected to each other are adjacent to each other and offset from the exhaust pipe to any one of the right side and the left side in the plan view.

7. The secondary-air supply structure for a saddle-ride type vehicle according to claim 4, wherein the sub air cleaner includes a cover, the upstream secondary-air supply pipes are connected to the sub air cleaner from a rear side, and a front side of the cover is a closed surface.

8. The secondary-air supply structure for a saddle-ride type vehicle according to claim 2, further comprising:
a fuel tank disposed above the cylinder head;
a secondary-air control device disposed forward of the cylinder head and under the fuel tank and provided upstream of the bent-back pipe sections; and
a sub air cleaner provided upstream of the secondary-air control device,
wherein the sub air cleaner is disposed under the fuel tank and offset from the exhaust pipe to any one of a right side and a left side in a plan view.

9. The secondary-air supply structure for a saddle-ride type vehicle according to claim 4, wherein the secondary-air supply pipes on the cylinder head side are formed of metallic pipes while upstream secondary-air supply pipes on the secondary-air control device side are formed of flexible pipes having flexibility, and connecting portions of the metallic pipes and the flexible pipes at which the metallic pipes and the flexible pipes are connected to each other are adjacent to each other and offset from the exhaust pipe to any one of the right side and the left side in the plan view.

10. The secondary-air supply structure for a saddle-ride type vehicle according to claim 5, wherein the secondary-air supply pipes on the cylinder head side are formed of metallic pipes while upstream secondary-air supply pipes on the secondary-air control device side are formed of flexible pipes having flexibility, and connecting portions of the metallic pipes and the flexible pipes at which the metallic pipes and the flexible pipes are connected to each other are adjacent to each other and offset from the exhaust pipe to any one of the right side and the left side in the plan view.

11. The secondary-air supply structure for a saddle-ride type vehicle according to claim 5, wherein the sub air cleaner includes a cover, the upstream secondary-air supply pipes are connected to the sub air cleaner from a rear side, and a front side of the cover is a closed surface.

12. The secondary-air supply structure for a saddle-ride type vehicle according to claim 6, wherein the sub air cleaner includes a cover, the upstream secondary-air supply pipes are connected to the sub air cleaner from a rear side, and a front side of the cover is a closed surface.

* * * * *